Feb. 23, 1965   U. KNIPP ETAL   3,170,972
METHOD OF EXTRUDING A POLYURETHANE ARTICLE
Filed Jan. 10, 1961
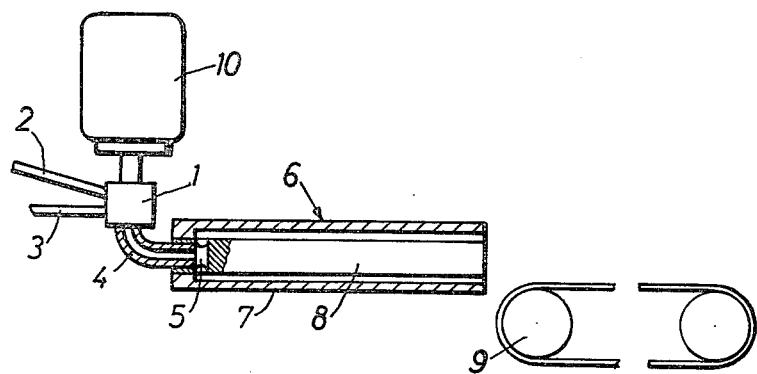
INVENTORS:
ULRICH KNIPP, CORNELIUS MÜHLHAUSEN,
BY
ATTORNEY

3,170,972
METHOD OF EXTRUDING A POLYURETHANE ARTICLE

Ulrich Knipp and Cornelius Mühlhausen, Leverkusen, Germany, assignors to Farbenfabriken Bayer Aktiengesellschaft, Leverkusen, Germany, a corporation of Germany
Filed Jan. 10, 1961, Ser. No. 81,869
Claims priority, application Germany, Jan. 14, 1960, F 30,290
3 Claims. (Cl. 264—176)

This invention relates to polyurethane plastics and more particularly to a method for preparing tubes and rods of polyurethane plastics.

Cross-linked polyurethanes in the past have been either cast or processed as millable gums by processes known in the rubber industry. Valuable cross-linked polyurethanes are obtained by casting processes, the resulting products having high strength and resistance to wear and aging. When it is desired to form thin walled tubes, it has been heretofore known to utilize a centrifugal casting process. This process, however, suffers the disadvantage that the length of the tubes formed are limited by the length of the centrifugal apparatus. When tube-like molds are filled with polyurethane elastomers by the prior art discontinuous process, the tube thus produced adheres to the core on account of the unavoidable shrinkage so that the tube cannot be removed from the mold without damage occurring.

The polyurethane plastics formed into the millable gum and worked on rollers such as used in the rubber industry can be processed into flexible tubes and other shaped elements, however, the cost is high because of the increased amount of equipment necessary and the additional time required. In addition to mixing in a mixing apparatus, a rolling step on suitable rolling mills, a shaping step in an extruder or other apparatus and a subsequent final heating step in a pressure chamber is necessary in order to exclude the formation of pores and variations in dimensions. In addition the size of the pressure chamber sets a limit on the dimensions of the profiled elements formed. Also, for example, when tubes of polyurethane are to be formed, the size of the tubes are greatly restricted with respect to their maximum cross-section by the dimensions of the extruder. It can, therefore, be seen that this process suffers various disadvantages.

It is, therefore, an object of this invention to provide a method for preparing tubes or rods of polyurethane plastics. It is another object of this invention to provide an improved method for continuously fabricating polyurethane rods and tubes. It is a further object of this invention to provide a simplified and more economical method for making polyurethane rods and tubes.

The foregoing objects and others which will become apparent from the following description taken in conjunction with the accompanying drawing are accomplished in accordance with the invention, generally speaking, by providing shaped elements such as solid rods or tubes of any desired cross section and length by mixing the reaction components of a polyurethane plastic and continuously introducing the still liquid reaction mixture into a nozzle element conforming to the desired profile of the finished rod or tube, the nozzle element having a length such that the material is permitted to react therein to form a wax-like solid structure which will retain its shape before it is discharged from the tube. Thus, the invention contemplates mixing the reaction ingredients of a polyurethane plastic and immediately introducing the liquid mixture into a nozzle element which has a predetermined length to establish and retain the desired shape until sufficient reaction occurs therein producing at the discharge end a dimensionally stable body. The mixture is thus forced toward the discharge end of the nozzle at a designated rate to give the desired residence time within the nozzle by the liquid polyurethane reaction mixture being introduced into the nozzle element to produce at the discharge end of the nozzle element a dimensionally stable member having a cross-sectional configuration conforming to the shape of the nozzle. Where rods or tubes are produced, there is no tendency for them to flatten or taken on an oval shape after leaving the nozzle element. Also the reaction within the nozzle does not proceed far enough to permit shrinkage of the material about the mandrel with a resulting clogging of the device.

The process of this invention will become more apparent in conjunction with the accompanying drawing in which:

The drawing is a schematic view of an apparatus utilized in accordance with this invention.

In the apparatus shown in FIGURE 1, the reaction ingredients comprising hydroxyl polyesters or polyhydric polyalkylene ethers and organic polyisocyanates are introduced into the pressure-tight mixer 1 through a suitable pipe 2 and a cross-linking agent is introduced under super atmospheric pressure through the pipe 3. The liquid reaction mixture which issues from the mixer 1 which contains an agitator driven by motor 10 is introduced via the heating pipe 4 and the core duct 5 into the nozzle element 6 which has a tubular cross section. The nozzle element 6 consists of a heating jacket 7 and also, if necessary, a mandrel 8 which may have a conical or frustoconical shape with the base thereof being at the discharge end. The conical mandrel 8 is positioned concentrically with the nozzle element 6 and decreases in diameter in a direction toward the discharge point of the nozzle element 6. The material introduced into the nozzle element 6 reacts therein while it is moving from the core duct 5 to the discharge end to form a wax-like tube which is dimensionally stable. This dimensionally stable tube is forced from the nozzle element 6 by the material flowing out of the mixer 1 under pressure. Positioned adjacent the discharge outlet of the nozzle element 6 is a withdrawal means 9 which comprises an endless belt or other suitable means for conveying the material into a heated tunnel (not shown) in which the cross-linking action is concluded. The final cure is conducted for a period from 20 to about 50 hours at a temperature of about 100° C. to about 130° C.

In the process of this invention, the components of a polyurethane plastic, which generally include an organic compound containing active hydrogen containing groups in the molecule as determined by the Zerewitinoff method, an organic polyisocyanate and a cross-linking agent are introduced into a mixing device which preferably is operated under pressure and contains a means for agitating the reaction mixture. These components can be introduced separately or one or more may be introduced together. The admixed components are then immediately passed into a heated tube having a cross-sectional configuration to produce the desired shape of the completed article. The liquid reaction components being under pressure push the material in front of it toward the discharge end of the nozzle element. Before the material reaches the discharge end of the nozzle element, sufficient reaction takes place to enable the material being discharged to maintain its shape which had previously been imparted by the internal cross-sectional configuration of the nozzle element.

It has been found that the wall temperature of the nozzle element must be at least equal to the temperature of the polyurethane reaction mixture. That is, since the polyurethane reaction is exothermic, the wall temperature of the nozzle element must be at least equal to the temperature of the reaction mixture caused by the exothermic reaction. A temperature range of from about 120° C. to about 150° C. is preferred. Furthermore, the internal configuration of the apparatus must be such that the polyrethane reaction product and ingredients cannot adhere to the wall thereof. That is, the internal configuration must be very smooth and contain no protrusions or other obstacles which would prevent the reaction mixture from passing immediately to the discharge end of the element. This separating effect is achieved by providing a very smooth coating of polytetrafluoroethylene on the inside wall of the nozzle element.

In the production of hollow profile elements, for example, tubes, it has been found that depending upon the length of the nozzle element and the required wall thickness of the shaped member, it is necessary that the mandrel be tapered between 0 and 7% based on the diameter of the mandrel. Or for the mandrel to be cylindrical adjacent to the inlet of the nozzle element and then to be a conical formation with the values indicated. In accordance with the process, either solid or porous elements may be produced. As stated previously, the reaction components of any suitable polyurethane plastic may be used in the process of this invention. Any suitable compound containing active hydrogen containing groups in the molecule as determined by the Zerewitinoff method and having an hydroxyl number of from about 200 to about 30 and a molecular weight of from about 500 to about 4000 may be used such as, for example, hydroxyl polyesters prepared by reacting polyhydric alcohols and polycarboxylic acids, polyhydric polyalkylene ethers and polyhydric polythioethers.

Any suitable hydroxyl polyester may be used such as, for example, the reaction product of a polycarboxylic acid and a polyhydric alcohol. Any suitable polycarboxylic acid may be used in the preparation of polyesters such as, for example, adipic acid, succinic acid, suberic acid, sebacic acid, oxalic acid, methyladipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, taconic acid and the like. Any suitable polyhydric alcohol may be used in the reaction with the polycarboxylic acid to form a polyester such as, for example, ethylene glycol, propylene glycol, butylene glycol hexanediol, bis-(hydroxy-methyl-cyclohexane), 1,4-butanediol, diethylene glycol, 2,2- dimethyl propylene glycol, 1,3-propylene glycol, hexanetriol, trimethylol propane, glycerine, pentaerythritol and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology"; volume 7, page 257 to 262 published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide, 4-4'-dihydroxy butylsulfiide, 1,4-(β-hydroxy ethyl) phenylene dithioether and the like.

Any suitable organic diisocyanate may be used in the process of this invention such as, for example, aliphatic diisocyanates, aromatic diisocyanates, alicyclic diisocyanates, and heterocyclic diisocyanates including such as, for example, ethylene diisocyanate, ethylidene diisocyanate, propylene diisocyanate, butylene diisocyanate, cyclopentylene-1,3-dissocyanate, cyclohexylene - 1,4 - diisocyanate, cyclohexylene-1,2- diisocyanate, 2,4-tolylene diisocyanate, 2,6-tolylene diisocyanate, 4,4'-diphenylmethane diisocyanate, 2,2-diphenylpropane-4,4'-diisocyanate, p- phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone - 4,4' - diisocyanate, dichlorohexamethylene diisocyanate, tetramethylene diisocyanate, pentamethylene diisocyanate, hexamethylene diisocyanate, 1-chlorobenzene - 2,4 - diisocyanate, furfurylidene diisocyanate, triphenyl methane triisocyanate and the like.

Any suitable cross-linking agent having active hydrogen containing groups reactive with isocyanate groups may be used such as, for example, diols including ethylene glycol, propylene glycol, 1,3-butanediol, 1,4-butanediol, butenediol, butynediol, xylene glycols, amylene glycols, 1,4-phenylene-bis-β-hydroxy ethyl ether, 1,3-phenylene-bis-β-hydroxy ethyl ether, bis-(hydroxy-methyl-cyclohexane), hexanediol, thiodiglycol and the like; diamines including ethylene diamine, propylene diamine, butylene diamine, hexamethylene diamine, cyclohexylene diamine, phenylene diamine, tolylene diamine, xylylene diamine, 3,3'-dichlorobenzidine, 3,3'-dinitrobenzidine and the like; alkanol amines such as, for example, ethanol amine, aminopropyl alcohol, 2,2'-dimethylpropanol amine, 3-aminocyclohexyl alcohol, p-amino benzyl alcohol, glycerine, trimethylol propane, hexanetriol, pentaerythritol and the like.

Other organic compounds having reactive hydrogens suitable for reaction with the diisocyanate in accordance with this invention include all of those heretofore disclosed for this purpose such as polyacetals disclosed in U.S. Patent 2,071,252, carbon monoxide-olefin polymers disclosed in U.S. Patent 2,839,478 and the like. In fact any such compound having a molecular weight of at least 600 can be used, but best results are obtained with polyesters, polyalkylene ether glycols and poly-(alkylene thioether) glycols.

The invention is illustrated by the following examples without being restricted thereto, the parts given being parts by weight.

*Example 1*

100 parts of a polythioether of the hydroxyl number 58 are dehydrated in vacuum at 135° C. and then heated to 146° C. 60 parts of naphthylene-1,5-diisocyanate are added, and reacted with the polythioether for about 10–15 minutes. The reaction product is fed through pipe 3 into the mixer 1. 16 parts of 1,4-butanediol are continuously introduced into the mixer 1 through pipe 3. The still liquid reaction mixture is fed under pressure into the nozzle element 6 having a length of 400 mm. and an inside diameter of 60 mm., which nozzle element is heated up to 135° and is provided with a coating of polytetrafluoroethylene, at a discharge rate of 200 grams per minute. The mixture leaves the nozzle element 6 as a solid rod which is finally heated at 110° C. for another 24 hours.

*Example 2*

100 parts of a linear polyester of adipic acid and ethylene glycol, having a hydroxyl number of 56, are dehydrated at 135° C., cooled to 130° C. and then reacted with 60 parts of diphenylmethane-4,4'-diisocyanate for 15 minutes. 16 parts of 1,3-butanediol are continuously fed to the mixer 1 and admixed therein with the other components. The still liquid reaction mixture is fed to the nozzle element 6, which is heated to 140° C., at a discharge rate of 300 grams per minute. The nozzle element is provided with a coating of polytetrafluoroethylene and has an inside diameter of 60 mm. and a length of 500 mm. The rod thus produced is finally heated at 100° C. for 30 hours.

It is possible according to the invention to operate the mixer at varying discharge rates provided that the residence time in the nozzle element which is designed to impart the desired shape to the finished rod or tube is longer than one and a half times the curing time. Thus, the product leaves the nozzle element in solid form. The residence time is determined by the feeding rate of the reaction mixture in the nozzle element 6. The feeding rate is determined by controlled delivery pumps (gear pumps with infinitely variable gear transmission) (not shown in the drawing). The production of the rod or tube is not determined by the length of the nozzle element, but by the feeding rate of the reaction mixture to the nozzle element. A high feeding rate requires a nozzle element of considerable length, while a short nozzle element is sufficient if the feeding rate is low. The curing time which must be shorter than the feeding rate can be varied within wide limits by varying the reaction temperature and using starting components of different reactivity. It is therefore not possible to indicate an accurate relation between the length of the nozzle element 6 and the discharge rate for certain starting components.

The nozzle element is maintained at temperatures between 120 and 150° C. The use of components of high reactivity requires the application of the maximum temperature (150° C.) in order to ensure that the same temperature prevails throughout the entire cross-section of the rod or tube. As distinguished from the prior art processes, any shrinkage does not occur in the process of the invention in which the material which is still hot is continuously forced out of the nozzle element.

In practicing our invention all compression-resistant mixers which allow the continuous discharge of the mixture can be used.

According to the process of the invention, solid polyurethane, having a hardness above 90 Shore A, as well as porous polyurethane plastics, having a compression hardness above 6 kg., measured at a deformation of 20%, can be produced.

Although the invention has been described in considerable detail for the purpose of illustration, it is to be understood that variations may be made therein by those skilled in the art without departing from the spirit of the invention and the scope of the claims.

What is claimed is:

1. A process for forming polyurethane plastic rods and tubes which comprises mixing under pressure the liquid reaction components of a polyurethane plastic, immediately passing the still liquid reaction mixture under the pressure exerted in said mixing step through a passageway having substantially smooth walls at a rate such that the residence time therein is longer than 1½ times the curing of the reaction mixture and maintaining the temperature of said passageway at least equal to that of said polyurethane reaction mixture, said passageway having the cross-sectional configuration of the desired final product so the liquid components react within said passageway to form a dimensionally stable product before exiting therefrom.

2. The process for forming polyurethane plastic rods and tubes which comprises mixing under pressure the liquid reaction components of polyurethane plastic, immediately passing the still liquid reaction mixture under the pressure exerted in said mixing step through a passageway having substantially smooth walls at a rate such that the residence time therein is longer than 1½ times the curing time of the reaction mixture and maintaining the temperature of said passageway at from about 120° C. to about 150° C., said passageway having the cross-sectional configuration of the desired final product so the liquid components react within said passageway to form a dimensionally stable product before exiting therefrom.

3. A process for forming polyurethane plastic rods and tubes which comprises mixing under pressure a member selected from the group consisting of hydroxy polyesters prepared by the process which comprises reacting a polyhydric alcohol with a polycarboxylic acid, polyhydric polyalkylene ethers and polythioethers with an organic polyisocyanate and a cross-linking agent, immediately passing the still liquid reaction mixture under the pressure exerted in said mixing step through a passageway having substantially smooth walls at a rate such that the residence time therein is longer than 1½ times the curing time of the reaction mixture and maintaining the temperature of said passageway at least equal to that of said polyurethane reaction mixture, said passageway having the cross-sectional configuration of the desired final product so the liquid components react within said passageway to form a dimensionally stable product before exiting therefrom.

References Cited in the file of this patent

UNITED STATES PATENTS

| | | |
|---|---|---|
| 2,689,374 | Toulmin | Sept. 21, 1954 |
| 2,747,222 | Koch et al. | May 29, 1956 |
| 2,764,565 | Hoppe et al. | Sept. 25, 1956 |
| 2,770,841 | Cooke et al. | Nov. 20, 1956 |
| 2,871,218 | Schollenberger | Jan. 27, 1959 |
| 2,885,268 | Breer et al. | May 5, 1959 |
| 2,898,626 | Alderfer et al. | Aug. 11, 1959 |
| 2,957,207 | Roop et al. | Oct. 25, 1960 |
| 2,990,380 | Auerbach et al. | June 27, 1961 |
| 3,057,694 | Kessler | Oct. 9, 1962 |

FOREIGN PATENTS

| | | |
|---|---|---|
| 842,267 | Germany | Sept. 15, 1952 |
| 548,684 | Italy | Sept. 28, 1956 |

OTHER REFERENCES

Dupont booklet, "Rigid Urethane Foams; Methods of Application," June 1957, pp. 3–7 (particularly pages 4 and 6).